United States Patent
Ohkubo et al.

(10) Patent No.: US 11,306,234 B2
(45) Date of Patent: Apr. 19, 2022

(54) COMPOSITION CONTAINING REFRIGERANT AND APPLICATION THEREOF

(71) Applicant: DAIKIN INDUSTRIES, LTD., Osaka (JP)

(72) Inventors: Shun Ohkubo, Osaka (JP); Mitsushi Itano, Osaka (JP); Hitomi Kuroki, Osaka (JP); Tatsumi Tsuchiya, Osaka (JP); Kenji Gobou, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/047,201

(22) PCT Filed: Apr. 17, 2019

(86) PCT No.: PCT/JP2019/016471
§ 371 (c)(1),
(2) Date: Oct. 13, 2020

(87) PCT Pub. No.: WO2019/203271
PCT Pub. Date: Oct. 24, 2019

(65) Prior Publication Data
US 2021/0122961 A1    Apr. 29, 2021

(30) Foreign Application Priority Data
Apr. 19, 2018 (JP) .............. JP2018-080436

(51) Int. Cl.
C09K 5/04    (2006.01)
F25B 1/047   (2006.01)

(52) U.S. Cl.
CPC .............. *C09K 5/045* (2013.01); *F25B 1/047* (2013.01); *C09K 2205/22* (2013.01); *C09K 2205/40* (2013.01)

(58) Field of Classification Search
CPC ............... C09K 2205/22; C09K 5/045; C09K 2205/122; C09K 2205/126; C09K 2205/128
See application file for complete search history.

(56) References Cited

U.S. PATENT DOCUMENTS

| 6,028,066 | A  | * | 2/2000  | Unger    | A61K 47/544  |
|           |    |   |         |          | 514/180      |
| 6,230,519 | B1 | * | 5/2001  | Arman    | F25J 3/04678 |
|           |    |   |         |          | 62/643       |
| 8,168,077 | B2 |   | 5/2012  | Spatz    |              |
| 9,029,616 | B2 |   | 5/2015  | Nair et al. |            |
| 2003/0034309 | A1 | * | 2/2003 | Ohno    | C07C 17/38   |
|           |    |   |         |          | 210/690      |
| 2013/0152626 | A1 | * | 6/2013 | Feng    | C09K 5/045   |
|           |    |   |         |          | 62/513       |
| 2016/0018135 | A1 |   | 1/2016 | Yuzawa et al. |        |
| 2016/0160694 | A1 | * | 6/2016 | Alekseev | F25J 1/0042  |
|           |    |   |         |          | 60/651       |
| 2017/0174967 | A1 |   | 6/2017 | Itano et al. |         |
| 2018/0249738 | A1 | * | 9/2018 | Cantrell | B32B 5/26    |
| 2019/0309202 | A1 |   | 10/2019 | Long    |              |

FOREIGN PATENT DOCUMENTS

| CN | 102559146   | 7/2012  |
| CN | 102660229   | 9/2012  |
| CN | 102719226   | 10/2012 |
| CN | 108531135   | 9/2018  |
| JP | 2004-2492   | 1/2004  |
| JP | 2009-19164  | 1/2009  |
| JP | 2016-70571  | 5/2016  |
| JP | 2016-156001 | 9/2016  |
| JP | 2016-531177 | 10/2016 |
| JP | 2017-218508 | 12/2017 |
| JP | 2018-508597 | 3/2018  |
| WO | 03/027206   | 4/2003  |
| WO | 2014/134821 | 9/2014  |
| WO | 2014/156190 | 10/2014 |
| WO | 2015/015188 | 2/2015  |
| WO | 2016/120645 | 8/2016  |
| WO | 2018/211283 | 11/2018 |

OTHER PUBLICATIONS

International Search Report dated Jul. 16, 2019 in International (PCT) Application No. PCT/JP2019/016471.
Extended European Search Report dated Dec. 7, 2021 in European Patent Application No. 19787602.2.

* cited by examiner

*Primary Examiner* — John R Hardee

(74) *Attorney, Agent, or Firm* — Wenderoth, Lind & Ponack, L.L.P.

(57) ABSTRACT

The present invention provides a composition containing a refrigerant having characteristics equal to or higher than those of R23. Specifically, the present invention provides a composition containing a refrigerant, wherein the refrigerant contains (a) at least one perfluorocarbon (PFC) selected from the group consisting of PFC-14, PFC-116, PFC-c216, PFC-218, PFC-c318, and PFC-31-10, and (b) an unsaturated compound.

13 Claims, No Drawings

COMPOSITION CONTAINING REFRIGERANT AND APPLICATION THEREOF

TECHNICAL FIELD

The present invention relates to a composition containing a refrigerant and to application of the composition.

BACKGROUND ART

Hydrofluorocarbons (HFCs) typified by HFC-32 (difluoromethane, $CH_2F_2$, R32, boiling point: −52° C.) and HFC-125 (pentafluoroethane, $CF_3CHF_2$, R125, boiling point: −48° C.) have been widely used as important alternative substances for CFC, HCFC, etc., which are known as substances that destroy the ozone layer.

As such alternatives, known are the single-refrigerant HFC-23 (trifluoromethane, $CHF_3$, R23, boiling point: −82° C.); R410A, which is a mixed refrigerant of HFC-32 and HFC-125; R404A, which is a mixed refrigerant of HFC-125, HFC-134a, and HFC-143a; and the like (Patent Literature 1 to 3).

CITATION LIST

Patent Literature

PTL 1: U.S. Pat. No. 9,029,616
PTL 2: U.S. Pat. No. 8,168,007
PTL 3: WO2003/27206

SUMMARY OF INVENTION

Technical Problem

An object of the present invention is to provide a composition containing a refrigerant having characteristics equivalent to or higher than those of R23.

Solution to Problem

The present invention provides the following embodiments.
Item 1.
A composition comprising a refrigerant, wherein the refrigerant comprises
(a) at least one perfluorocarbon (PFC) selected from the group consisting of PFC-14, PFC-116, PFC-c216, PFC-218, PFC-c318, and PFC-31-10, and
(b) an unsaturated compound.
Item 2.
The composition according to Item 1, wherein the (b) unsaturated compound comprises at least one compound selected from the group consisting of HFO-1234yf, HFO-1234ze(E), HFO-1234ze(Z), HFO-1225ye, FO-1114, HFC-1123, HFO-1132a, HFO-1132(E), HFO-1132(Z), HCFO-1233zd, HCFO-1224yd, and HCFO-1122a.
Item 3.
The composition according to Item 1 or 2, further comprising (c) HFC.
Item 4.
The composition according to Item 3, wherein the (c) HFC comprises at least one compound selected from the group consisting of HFC-23, HFC-32, RFC-125, HFC-143a, HFC-134a, and HFC-134.
Item 5.
The composition according to any one of Items 1 to 4, wherein the (a) PFC comprises PFC-14.
Item 6.
The composition according to Item 5, wherein the (b) unsaturated compound comprises at least one compound selected from the group consisting or HFO-1123, HFO-1132a, and HFO-1132(E).
Item 7.
The composition according to Item 6, wherein the (c) HFC comprises at least one compound selected from the group consisting of HFC-23, HFC-32, and HFC-125.
Item 8.
The composition according to Item 6 or 7, wherein the (b) unsaturated compound comprises HFO-1132a.
Item 9.
The composition according to Item 5, wherein the (b) unsaturated compound comprises at least one compound selected from the group consisting of HFO-1234yf, HFC-1234ze(E), HFO-1123, and HFO-1132(E), and the (c) HFC comprises at least one compound selected from the group consisting of HFC-32, HFC-125, and HFC-134a.
Item 10.
The composition according to any one of items 5 to 9, wherein the (a) PFC-14 is contained in an amount of 1 to 15 mass % based on the total amount of the refrigerant.
Item 11.
The composition according to any one of Items 1 to 10, further comprising a refrigerant oil and is used as a working fluid for a refrigeration apparatus.
Item 12.
The composition according to Item 11, wherein the refrigerant oil comprises at least one polymer selected from the group consisting of polyalkylene glycols (PAGs), polyol esters (POEs), and polyvinyl ethers (PVEs).
Item 13.
The composition according to any one of Items 1 to 12, which is used as an alternative refrigerant for R23, R404A, or R410A.
Item 14.
The composition according to any one of Items 1 to 13, further comprising at least one material selected from the group consisting of tracers, compatibilizing agents, ultraviolet fluorescent dyes, stabilizers, and polymerization inhibitors.
Item 15.
A refrigeration method comprising operating a refrigeration cycle using the composition according to any one of Items 1 to 14.
Item 16.
A refrigeration apparatus comprising the composition according to any one of Items 1 to 14.
Item 17.
The refrigeration apparatus according to Item 16, which is at least one member selected from the group consisting of air-conditioning systems, refrigerators, freezers, water coolers, ice makers, refrigerated showcases, freezing showcases, freezing and refrigerating units, refrigerating machines for freezing and refrigerating warehouses, air-conditioning systems for vehicles, turbo refrigerating machines, and screw refrigerating machines.
Item 18.
The composition according to any one of Items 1 to 14, for use as a refrigerant.
Item 19.
The composition according to Item 18, for use as a refrigerant in a refrigeration apparatus.

Item 20.

The composition according to Item 19, wherein the refrigeration apparatus is an air-conditioning system, a refrigerator, a freezer, a water cooler, an ice maker, a refrigerated showcase, a freezing showcase, a freezing and refrigerating unit, a refrigerating machine for freezing and refrigerating warehouses, an air-conditioning system for vehicles, a turbo refrigerating machine, and a screw refrigerating machine.

Item 21.

Use of the composition according to any one of Items 1 to 14 as a refrigerant.

Item 22.

The use according to Item 21, which is for a refrigeration apparatus.

Item 23.

The use according to Item 22, wherein the refrigeration apparatus is an air-conditioning system, a refrigerator, a freezer, a water cooler, an ice maker, a refrigerated showcase, a freezing showcase, a freezing and refrigerating unit, a refrigerating machine for freezing and refrigerating warehouses, an air-conditioning system for vehicles, a turbo refrigerating machine, or a screw refrigerating machine.

Advantageous Effects of Invention

The composition containing a refrigerant according to the present invention has characteristics equivalent to or higher than those of R23.

DESCRIPTION OF EMBODIMENTS

To attain the above object, the present inventors conducted extensive research. As a result, the inventors found that a composition containing perfluorocarbon (PFC), an unsaturated compound, etc. as refrigerants has desired characteristics.

The present invention was accomplished as a result of further research based on such findings. The present, invention includes the following embodiments.

Definition of Terms

Numerical ranges expressed by using "to" in the present specification indicate a range that includes the numerical values before and after "to" stated as the minimum and maximum values respectively.

In the present specification, the terms "comprise" and "contain" include the concepts of "consisting essentially of" and "consisting of."

In this specification, the term "refrigerant" includes at least compounds that are specified in ISO817 (International Organization for Standardization), and that are given a refrigerant number (ASHRAE number) representing the type of refrigerant with an "R" at the beginning; and further includes refrigerants that have characteristics equivalent to those of such refrigerants, even though a refrigerant number is not given.

Refrigerants are broadly divided into fluorocarbon-based compounds and non-fluorocarbon-based compounds in terms of the structure of the compounds. Fluorocarbon-based compounds include chlorofluorocarbons (CFCs), hydrochlorofluorocarbons (HCFCs), and hydrofluorocarbons (HFCs). Non-fluorocarbon-based compounds include propane (R290), propylene (R1270), butane (R600), isobutane (R600a), carbon dioxide (R744), and ammonia (R717).

The terms "composition containing a refrigerant" used in the present specification at least includes:

(1) a refrigerant itself (including a mixture of refrigerants, i.e., a mixed refrigerant);
(2) a composition that can be used for obtaining a working fluid for a refrigeration apparatus by further containing one or more other components and mixing with at least a refrigerant oil; and
(3) a working fluid for a refrigeration apparatus, containing a refrigerant oil.

Among these three modes, composition (2) is referred to as a "refrigerant composition" in the present specification to distinguish it from a refrigerant itself (including a mixed refrigerant). Further, the working fluid for a refrigeration apparatus (3) is referred to as "a refrigerant oil-containing working fluid" to distinguish it from the "refrigerant composition."

In this specification, when the term "alternative" is used in the context in which the first refrigerant is replaced with the second refrigerant, the first type of alternative means that equipment designed for operation using the first refrigerant can be operated using the second refrigerant under optimum conditions, optionally with changes of only a few parts (at least one member of the refrigerant oil, gasket, packing, expansion valve, dryer, and other parts) and equipment adjustment. In other words, this type of alternative means that the same equipment is operated with an alternative refrigerant. Embodiments of this type of alternative include drop-in alternatives, nearly drop-in alternatives, and retrofits, in the order in which the extent of changes and adjustment necessary for replacing the first refrigerant with the second refrigerant is smaller.

The term "alternative" also includes the second type of alternative, which means that equipment designed for operation using the second refrigerant is operated for the same use as the existing use with the first refrigerant, using the second refrigerant. This type of alternative means that the same use is achieved with an alternative refrigerant.

In the present specification, the term "refrigeration apparatus" in the broad sense refers to apparatuses in general that draw heat from an object or space to make its temperature lower than the temperature of ambient air, and maintain the low temperature. In other words, refrigeration apparatuses in the broad sense refer to conversion machines that, gain energy from the outside to do work, and that perform energy conversion, in order to transfer heat from where the temperature is lower to where the temperature is higher. In the present invention, "refrigeration apparatus" is synonymous with "heat pump" in the broad sense.

In the present specification, the term "refrigeration apparatus" is distinguished from "heat pump" in the narrow sense, depending on the difference in the applied temperature range and operating temperature. In this case, an apparatus whose low-temperature heat source is placed in a temperature range lower than air temperature may be called a "refrigeration apparatus," while an apparatus whose low-temperature heat source is placed around air temperature to use the heat-release action caused by driving the refrigeration cycle may be called a "heat pump." Additionally, there are machines that have both the function of refrigeration apparatuses in the narrow sense and the function of heat pumps in the narrow sense, despite them being a single machine, such as air conditioners that provide both a cooling mode and a heating mode. In the present specification, unless otherwise indicated, the terms "refrigeration apparatus" and "heat pump" are used in the broad sense.

In the present specification, the term "air-conditioning system for vehicles" is a type of refrigeration apparatus for use in vehicles, such as gasoline vehicles, hybrid vehicles, electric vehicles, and hydrogen vehicles. The air-conditioning system for vehicles refers to a refrigeration apparatus that, has a refrigeration cycle in which heat exchange is performed by an evaporator using a liquid refrigerant, the evaporated refrigerant gas is absorbed by a compressor, the adiabatically compressed refrigerant gas is cooled and liquefied with a condenser, the liquefied refrigerant is adiabatically expanded by passing it through an expansion valve, and then the refrigerant is supplied again in the form of a liquid to the evaporator.

In the present specification, the term "turbo refrigerating machine" is a type of large refrigeration apparatus and refers to a refrigeration apparatus that has a refrigeration cycle in which heat exchange is performed by an evaporator using a liquid refrigerant, the evaporated refrigerant gas is absorbed by a centrifugal compressor, the adiabatically compressed refrigerant gas is cooled and liquefied with a condenser, the liquefied refrigerant, is adiabatically expanded by passing it through an expansion valve, and then the refrigerant is supplied again in the form of a liquid to the evaporator. The term "large refrigerating machine" refers to a large air-conditioner that is intended for air conditioning in a unit of a building.

In the present, specification, GWP is evaluated based on the values stated in the Intergovernmental Panel on Climate Change (IPCC) fourth report.

In the present specification, the (b) unsaturated compound does not contain (c) HFC.

In the present, specification, HFO-1234yf is 2,3,3,3-tetrafluoropropene, HFO-1234ze(E) is trans-1,3,3,3-tetrafluoropropene, HFO-1234ze(Z) is cis-1,3,3,3-tetrafluoropropene, HFO-1225ye is 1,2,3,3,3-pentafluoropropene, FO-1114 is tetrafluoroethylene, HFO-1123 is 1,1,2-trifluoroethylene, HFO-1132a is 1,1-difluoroethylene, and HFO-1132(E) is trans-1,2-difluoroethylene, HFO-1132(Z) is cis-1,2-difluoroethylene, HCFO-1233zd is 1-chloro-3,3,3-trifluoropropene, and HCFO-1224yd is 1-chloro-2,3,3,3-tetrafluoropropene, HCFO-1122a is 1,2-dichlorofluoroethylene, HFC-143a is 1,1,1-trifluoroethane, HFC-134a is 1,1,1,2-tetrafluoroethane, and HFC-134 is 1,1,2,2-hexafluoroethane.

1. Composition

The composition of the present invention contains a refrigerant, which is explained below. In this specification, the "refrigerant of the present invention" means the refrigerant contained in the composition of the present invention.

1.1 Refrigerant

The refrigerant contained in the composition of the present invention contains (a) at least one perfluorocarbon (PFC) selected from the group consisting of PFC-14 (perfluoromethane: $CF_4$), PFC-116 (perfluoroethane: $C_2F_6$), PFC-c216 (perfluorocyclopropane: c-$C_3F_6$), PFC-218 (perfluoropropane: $C_3F_8$), PFC-c318 (perfluorocyclobutane: $C_4F_8$), and PFC-31-10 (perfluorobutane: $C_4F_{10}$), and (b) an unsaturated compound.

The refrigerant of the present invention has the above feature and thus has the following characteristics: (1) the GWP is low (7000 or less), (2) it has a coefficient of performance (COP) equivalent to or higher than that of R23, and (3) it has a refrigeration capacity (sometimes referred to as cooling capacity or capacity) equivalent to or higher than that of R23.

Since the GWP is low, the refrigerant can notably reduce the burden on the environment from a global warming perspective, compared with other general-purpose refrigerants. Low GWP means that the GWP is generally 7000 or less, preferably 5000 or less, more preferably 4000 or less, and even more preferably 3000 or less.

The refrigeration capacity of the refrigerant of the present invention can replace that of R23. More specifically, the refrigeration capacity of the refrigerant of the present invention is preferably 45% or more, more preferably 70% or more, even more preferably 80% or more, and particularly preferably 90% or more relative to that of R23.

The refrigeration capacity of the refrigerant of the present invention can replace that of R404A. More specifically, the refrigeration capacity of the refrigerant of the present invention is preferably 80% or more, more preferably 90% or more. and even more preferably 100% or more relative to that of R404A.

The refrigeration capacity of the refrigerant of the present invention can replace that of R410A. More specifically, the refrigeration capacity of the refrigerant of the present invention is preferably 80% or more, mere preferably 90% or more, and even more preferably 100% or more relative to that of R410A.

In the refrigerant of the present invention, the ratio of refrigeration capacity to power consumed in a refrigeration cycle (coefficient of performance (COP)) is preferably high. Specifically, the COP of the refrigerant of the present invention relative to that of R23 is preferably 90% or more, more preferably 95% or more, even more preferably 100% or more, and particularly preferably 105% or more.

The COP of the refrigerant of the present invention relative to that of R404A is preferably 95% or more, more preferably 100% or more, and still more preferably 105% or more.

The COP of the refrigerant of the present invention relative to that of R410A is preferably 95% or more, more preferably 100% or more, and still more preferably 105% or more.

The refrigerant of the present invention preferably contains at least one compound selected from the group consisting of HFO-1234yf, HFO-1234ze(E), HFO-1234ze(Z), HFO-1225ye, FO-1114, HFO-1123, HFO-1132a, HFO-1132(E), HFO-1132(Z), HCFO-1233zd, HCFO-1224yd, and HCFO-1122a as the (b) unsaturated compound. Of these compounds, HFO-1132a is more preferable.

It is preferable that the refrigerant of the present invention further contain (c) RFC in addition to the (a) PFC and the (b) unsaturated compound. More preferably, the refrigerant of the present invention contains at least one compound selected from the group consisting of HFC-23, HFC-32, HFC-125, HFC-143a, HFC-134a, and HFC-134, as the (c) HFC. Of these compounds, HFC-23, HFC-32, and HFC-125 are more preferable.

The refrigerant, of the present invention preferably contains PFC-14 as the (a) PEC.

The refrigerant of the present invention preferably contains (a) PFC-14 and at least one PFC selected from the group consisting of PFC-116, PFC-c216, PFC-218, PFC-c318, and PFC-31-10; and (b) an unsaturated compound. In other words, the refrigerant of the present invention preferably contains (a) PFC-14 and at least one PFC selected from the group consisting of PFC-116, PFC-c216, PFC-218, PFC-c318, and PFC-31-10; and (b) an unsaturated compound. Because the refrigerant of the present invention has such a structure, it is suitably used as an alternative refrigerant for R23.

The refrigerant of the present invention preferably contains PFC-14 as the (a) PFC, and at least one compound selected from the group consisting of HFO-1123, HFO-1132a, and HFO-1132(E) as the (b) unsaturated compound. Because the refrigerant of the present invention has such a structure, it is suitably used as an alternative refrigerant, for R23.

The refrigerant of the present invention preferably contains PFC-14 as the (a) PFC, at least one compound selected from the group consisting of HFO-1123, HFO-1132a, and HFO-1132 (E) as the (b) unsaturated compound, and at least one compound selected from the group consisting of HFC-23, HFC-32, and HFC-125 as the (c) HFC. Because the refrigerant, of the present invention has such a structure, it is suitably used as an alternative refrigerant for R23.

The refrigerant of the present invention preferably contains PFC-14 as the (a) PFC and HFO-1132a as the (b) unsaturated compound.

The refrigerant of the present invention preferably contains PFC-14 as the (a) PFC, HFO-1132a as the (b) unsaturated compound, and at least one compound selected from the group consisting of HFC-23, HFC-32, and HFC-125 as the (c) HFC.

The refrigerant of the present invention contains PFC-14 as the (a) PFC, at least one compound selected from, the group consisting of HFO-1234yf, HFO-1234ze(E), HFO-1123, and HFO-1132 (E) as the (b) unsaturated compound, and at least one compound selected from the group consisting of HFC-32, HFC-125, and HFC-134a as the (c) HFC. Because the refrigerant of the present invention has such a structure, it is particularly suitably used as an alternative refrigerant for R410A or R404A.

From the viewpoint of improving the refrigeration capacity and setting the GWP to 7,000 or less, the refrigerant of the present invention preferably contains PFC-14 as the (a) PFC in an amount of 1 to 15 mass %, more preferably 2 to 12.5 mass %, even more preferably 2.5 to 10 mass %, and particularly preferably 5 to 10 mass % based on the total amount of the refrigerant.

It is particularly preferable that the refrigerant of the present invention contain PFC-14 as the (a) PFC, (b) unsaturated compound, and (c) HFC, and that the (b) unsaturated compound is HFO-1132a, and the (c) HFC is HFC-23, HFC-32, and HFC-125. In other words, it is particularly preferable that the refrigerant of the present invention contain PFC-14 as the (a) PFC, HFO-1132a as the (b) unsaturated compound (b), and HFC-23, HFC-32, and HFC-125 as the (c) HFC.

The refrigerant of the present invention has the above feature and thus has the following characteristics: (1) the GWP is low (7000 or less), (2) it has a COP equivalent to or higher than that of R23, and (3) it has a refrigeration capacity equivalent to or higher than that of R23.

In the composition containing a refrigerant of the present invention, the total amount of the (a) PFC, (b) unsaturated compound, and (c) MFC in 100 mass % of the refrigerant is preferably 95 mass % or more, more preferably 99 mass % or more, even more preferably 99.5 mass % or more, and particularly preferably 100 mass %.

In the composition containing a refrigerant of the present invention, it is particularly preferable that the refrigerant consist of the (a) PFC, (b) unsaturated compound, and (c) HFC.

It is preferable that the composition containing a refrigerant of the present invention contain PFC-14 as the (a) PFC, HFO-1132a as the (b) unsaturated compound, and HFC-23, HFC-32, and HFC-125 as the (c) HFC, and that PFC-14 be present in an amount of 1 to 15 mass %, HFO-1132a be present in an amount of 5 to 60 mass %, and the (c) HFC be present in an amount of 25 to 94 mass % when the total amount of PFC-14, HFO-1132a, and the (c) HFC is 100 mass %.

It is more preferable that the composition containing a refrigerant of the present invention contain PFC-14 as the (a) PFC, HFO-1132a as the (b) unsaturated compound, and HFC-23, HFC-32, and HFC-125 as the (c) HFC, and that PFC-14 be present in an amount of 2 to 12.5 mass %, HFO-1132a be present in an amount of 5 to 55 mass %, and the (c) HFC be present in an amount of 32.5 to 93 mass % when the total amount of PFC-14, HFO-1132a, and the (c) HFC is 100 mass %.

It is more preferable that the composition containing the refrigerant of the present invention contain PFC-14 as the (a) PFC, HFO-1132a as the (b) unsaturated compound, and HFC-23, HFC-32, and HFC-125 as the (c) HFC, and that PFC-14 be present in an amount of 2 to 12.5 mass %, HFO-1132a be present in an amount, of 5 to 55 mass %, and the (c) HFC be present in an amount of 32.5 to 93 mass % when the total amount of PFC-14, HFO-1132a, and the (c) HFC is 100 mass %.

It is still more preferable that the composition containing a refrigerant of the present invention contain PFC-14 as the (a) PFC, HFO-1132a as the (b) unsaturated compound, and HFC-23, HFC-32, and HFC-125 as the (c) HFC, and that PFC-14 be present in an amount of 2.5 to 10 mass %, HFO-1132a be present in an amount of 5 to 50 mass %, and the (c) HFC be present in an amount of 40 to 92.5 mass % when the total amount of PFC-14, HFO-1132a, and the (c) HFC is 100 mass %.

It is particularly preferable that the composition containing a refrigerant of the present invention contain PFC-14 as the (a) PFC, HFC-1132a as the (b) unsaturated compound, and HFC-23, HFC-32, and HFC-125 as the (c) HFC, and that PFC-14 be present in an amount of 5 to 10 mass %, HFO-1132a be present in an amount of 5 to 45 mass %, and the (c) HFC be present in an amount of 45 to 90 mass % when the total amount of PFC-14, HFO-1132a, and the (c) HFC is 100 mass %.

1.2 Application

The composition containing the refrigerant of the present invention can be widely used as a working fluid for known refrigerant applications in 1) a refrigeration method comprising operating a refrigeration cycle and 2) a method for operating a refrigeration apparatus that operates a refrigeration cycle.

The refrigeration cycle herein means performing energy conversion by circulating in the refrigeration apparatus the refrigerant (the refrigerant of the present invention) in the state of the single refrigerant, or in the state of a refrigerant composition or a refrigerant-oil-containing working fluid explained below, through a compressor.

The present invention includes use of the refrigerant (or composition containing a refrigerant) of the present invention in a refrigeration method, use of the refrigerant (or composition containing a refrigerant) of the present invention in a method of operating a refrigeration apparatus etc., and a refrigeration apparatus or the like comprising the refrigerant (or composition containing a refrigerant) of the present invention.

In the present invention, it is also possible to produce a unit for forming a refrigeration cycle in which the composition containing the refrigerant of the present invention is circulated via a compressor.

Examples of refrigeration apparatuses in which the refrigerant (or a composition containing a refrigerant) of the present invention can be used include at least one device selected from the group consisting of air-conditioning systems, refrigerators, freezers, water coolers, ice makers, refrigerated showcases, freezing showcases, freezing and refrigerating units, refrigerating machines for freezing and refrigerating warehouses, air-conditioning systems for vehicles, turbo refrigerating machines, and screw refrigerating machines.

The composition of the present invention is appropriately used as an alternative refrigerant for R23, R404A, or R410A.

2. Refrigerant Composition

The refrigerant composition of the present invention at least includes the refrigerant of the present invention and can be used for the same applications as the refrigerant of the present invention.

Further, the refrigerant composition of the present invention is further mixed with at least a refrigerant oil, and thus the refrigerant composition can be used for obtaining a working fluid for a refrigeration apparatus.

The refrigerant composition of the present invention further contains at least one other component in addition to the refrigerant of the present invention. The refrigerant composition of the present invention may optionally contain at least one of the other components describes below.

As described above, when the refrigerant composition of the present invention is used as a working fluid for a refrigeration apparatus, it is usually mixed with at least a refrigerant oil for use.

It is preferable that the refrigerant composition of the present invention does not substantially contain a refrigerant oil. Specifically, in the refrigerant composition of the present invention, the amount of the refrigerant oil based on the entire refrigerant composition is preferably 0 to 1 mass %, more preferably 0 to 0.5 mass %, even more preferably 0 to 0.25 mass %, and particularly preferably 0 to 0.1 mass %.

2.1 Oxygen

The refrigerant, composition of the present invention can contain oxygen. The amount of oxygen when contained is preferably 0 to 0.5 mass %, more preferably 0 to 0.3 mass %, and particularly preferably 0 to 0.1 mass % based on 100 mass % of the refrigerant composition of the present invention.

When the amount of oxygen its within the above range, the stability of the refrigerant composition of the present invention is improved.

2.2 Water

When the refrigerant composition of the present invention contains oxygen, it can further contain water as another additional component. The amount of water contained in the refrigerant, composition is preferably 0 to 0.1 mass %, more preferably 0 to 0.075 mass %, even more preferably 0 to 0.05 mass %, and particularly preferably 0 to 0.025 mass % based on the entire refrigerant.

The amount of water within the above range results in an unexpected effect that the chemical stability of the refrigerant composition of the present invention increases. The reason for this is considered to be as follows. Specifically, when the refrigerant composition of the present invention contains oxygen and further contains water, the double bonds in the molecules of the unsaturated compounds (unsaturated fluorinated hydrocarbons) contained in the refrigerant composition can be stably present, and oxidation of the unsaturated fluorinated hydrocarbons is less likely to occur. Consequently, the chemical stability of the refrigerant composition of the present invention is improved.

2.3 Tracer

A tracer is added to the refrigerant composition of the present, invention at a detectable concentration so that when the refrigerant composition of the present invention has been diluted, contaminated, or undergone other changes, the tracer can trace the changes.

The refrigerant composition of the present invention may contain a single tracer, or two or more tracers.

The tracer is not limited, and can be suitably selected from typically used tracers. Preferably, a compound that cannot became an impurity inevitably mixed into the refrigerant of the present invention can be selected as a tracer.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxides ($N_2O$). Of these, hydrofluorocarbons, hydrochlorofluorocarbons, chlorofluorocarbons, hydrochlorocarbons, fluorocarbons, and fluoroethers are preferred.

Specifically, the following compounds (sometimes referred to below as "tracer compounds") are more preferred as tracers:

HCC-40 (chloromethane, $CH_3Cl$),
HFC-41 (fluoromethane, $CH_3F$),
HFC-161 (fluoroethane, $CH_3CH_2F$),
HFC-245fa (1,1,1,3,3-pentafluoropropane, $CF_3CH_2CHF_2$),
HFC-236fa (1,1,1,3,3,3-hexafluoropropane, $CF_3CH_2CF_3$),
HFC-236ea (1,1,1,2,3,3-hexafluoropropane, $CF_3CHFCHF_2$),
HCFC-22 (chlorodifluoromethane, $CHClF_2$),
HCFC-31 (chlorofluoromethane, $CH_2ClF$),
CFC-1113 (chlorotrifluoroethylene, $CF_2=CClF$),
HFE-125 (trifluoromethyl difluoro methyl ether, $CF_3OCHF_2$),
HFE-134a (trifluoromethyl fluoromethyl ether, $CF_3OCH_2F$),
HFE-143a (trifluoromethyl methyl ether, $CF_3OCH_3$),
HFE-227ea (trifluoromethyl tetrafluoro ethyl ether, $CF_3OCHFCF_3$), and
HFE-236fa (trifluoromethyl trifluoro ethyl ether, $CF_3OCH_2CF_3$).

The tracer compound can be present in the refrigerant composition in a total concentration of 10 to 1000 ppm. The tracer compound is preferably present in the refrigerant composition in a total concentration of 30 to 500 ppm, more preferably 50 to 300 ppm, even more preferably 75 to 250 ppm, and particularly preferably 100 to 200 ppm.

2.4 Ultraviolet Fluorescent Dye

The refrigerant composition of the present invention may comprise a single ultraviolet fluorescent dye, or two or more ultraviolet fluorescent dyes.

The ultraviolet fluorescent dye is not limited, and can be suitably selected from typically used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. Of these, naphthalimide and coumarin are preferred.

2.5 Stabilizer

The refrigerant composition of the present invention may comprise a single stabilizer, or two or more stabilizers.

The stabilizer is not limited, and can be suitably selected from typically used stabilizers.

Examples of stabilizers include nitro compounds, ethers, and amines.

Examples of nitro compounds include aliphatic nitro compounds, such as nitromethane and nitroethane, and aromatic nitro compounds, such as nitro benzene and nitro styrene.

Examples of ethers include 1,4-dioxane.

Examples of amines include 2,2,3,3,3-pentafluoropropylamine and diphenyl amine.

Examples of stabilizers also include butylhydroxyxylene and benzotriazole in addition to nitro compounds, ethers, and amines.

The amount of the stabilizer is not limited. The amount of the stabilizer is usually 0.01 to 5 mass %, preferably 0.05 to 3 mass %, more preferably 0.1 to 2 mass %, even more preferably 0.25 to 1.5 mass %, and particularly preferably 0.5 to 1 mass %, based on the entire refrigerant.

The stability of the refrigerant composition of the present invention can be evaluated by a commonly used method without limitation. Examples of such methods include an evaluation method using the amount of free fluorine ions as an index according to ASHRAE Standard 97-2007, and the like. There is, for example, another evaluation method using the total acid number as an index. This method can be performed, for example, according to ASTM D 974-06.

2.6 Polymerization Inhibitor

The refrigerant composition of the present invention may comprise a single polymerization inhibitor, or two or more polymerization inhibitors.

The polymerization inhibitor is not limited, and can be suitably selected from typically used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The amount of the polymerization inhibitor is not limited. The amount of the polymerization inhibitor is usually 0.01 to 5 mass %, preferably 0.05 to 3 mass %, more preferably 0.1 to 2 mass %, even more preferably 0.25 to 1.5 mass %, and particularly preferably 0.5 to 1 mass %, based on the entire refrigerant.

2.7 Other Components that can be Contained in Refrigerant Composition

The refrigerant composition of the present invention can also contain the following components.

For example, fluorinated hydrocarbons that are different from the refrigerants mentioned above can be contained. Examples of fluorinated hydrocarbons used as other components are not limited. At least one fluorinated hydrocarbon selected from the group consisting of: HCFC-1122, HCFC-124, and CFC-1113 can be used.

As another component, at least one halogenated organic compound represented by formula (A): $C_mH_nX_p$, wherein each X is independently fluorine, chlorine, or bromine; m is 1 or 2; 2m+2 is greater than or equal to n+p; and p is greater than or equal to 1 can be contained. The halogenated organic compound is not limited, and preferable examples include difluorochloromethane, chloromethane, 2-chloro-1,1,1,2,2-pentafluoroethane, 2-chloro-1,1,1,2-tetrafluoroethane, 2-chloro-1,1-difluoroethylene, and trifluoroethylene.

As another component, at least one organic compound represented by formula (B): $C_mH_nX_p$, wherein each X is independently an atom other than a halogen atom; m is 1 or 2; 2m+2 is greater than or equal to n+p; and p is greater than or equal to 1 can be contained. The organic compound is not limited, and preferable examples include propane and isobutane.

The amounts of the fluorinated hydrocarbon, halogenated organic compound represented by formula (A), and organic compound represented by formula (B) are not limited. The total amount of these is preferably 0.5 mass % or less, more preferably 0.3 mass % or less, and particularly preferably 0.1 mass % or less, based on the total amount of the refrigerant composition.

3. Refrigerant-Oil-Containing Working Fluid

The refrigerant-oil-containing working fluid according to the present invention at least contains the refrigerant or the refrigerant composition of the present invention, and a refrigerant oil, and is used as a working fluid in a refrigeration apparatus. Specifically, the refrigerant-oil-containing working fluid according to the present invention can be obtained by mixing together the refrigerant or refrigerant composition with a refrigerant oil used in a compressor of a refrigeration apparatus.

The amount of the refrigerant oil is not limited, and is usually 10 to 50 mass %, preferably 12.5 to 45 mass %, more preferably 15 to 40 mass %, even more preferably 17.5 to 35 mass %, and particularly preferably 20 to 30 mass %, based on the entire refrigerant-oil-containing working fluid.

3.1 Refrigerant Oil

The composition of the present invention may comprise a single refrigerant oil or two or more refrigerant oils.

The refrigerant oil is not limited, and can be suitably selected from typically used refrigerant oils. In this case, refrigerant oils that are superior in increasing action on the miscibility with the mixture of the refrigerant of the present invention (mixed refrigerant of the present invention) and stability of the mixed refrigerant, for example, are suitably selected as necessary.

The base oil of the refrigerant oil is preferably, for example, at least one member selected from the group consisting of polyalkylene glycols (PAG), polyol esters (POE), and polyvinyl ethers (PVE).

The refrigerant oil may further contain an additive in addition to the base oil.

The additive may be at least one member selected from the group consisting of antioxidants, extreme-pressure agents, acid scavengers, oxygen scavengers, copper deactivators, anticorrosive agents, oily agents, and antifoaming agents.

A refrigerant oil with a kinematic viscosity of 5 to 400 cSt at 40° C. is preferable from the standpoint of lubrication.

The refrigerant-oil-containing working fluid according to the present invention may further optionally contain at least one additive. Examples of additives include compatibilizing agents described below.

3.2 Compatibilizing Agent

The refrigerant-oil-containing working fluid according to the present invention may comprise a single compatibilizing agent or two or more compatibilizing agents.

The compatibilizing agent is not limited, and can be suitably selected from typically used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkane. Of these, a polyoxyalkylene glycol ether is preferred.

EXAMPLES

The present invention is explained in detail below with reference to Examples and Comparative Examples. However, the present invention is not limited to the scope of the Examples.

The GWP of each mixed refrigerant prepared in Examples 1 to 21 and Comparative Examples 2 and 3, and the GWP of Comparative Example 1 (R23), were evaluated based on the values in the IPCC fourth report.

The COP and refrigeration capacity of each of the mixed refrigerants prepared in Examples 1 to 21 and Comparative Examples 2 and 3, and the COP and refrigeration capacity of Comparative Example 1 (R23) were determined by performing refrigeration cycle theoretical calculations by using the National Institute of Science and Technology (NIST) and Reference Fluid Thermodynamic and Transport Properties Database (Refprop 9.0) under the following conditions.

Evaporation temperature: −70° C.
Condensation temperature: −35° C.
Superheating temperature: 5 K
Supercooling temperature: 5 K
Compressor efficiency: 70%

The GWP, COP, and refrigeration capacity calculated based on the results are shown in Tables 1 and 2 below. In Tables 1 and 2, "COP ratio" and "refrigeration capacity ratio" refer to ratios (%) relative to R23.

The coefficient of performance (COP) was calculated according to the following equation.

COP=(refrigeration capacity or heating capacity)/ amount of electrical power consumed.

The results of the following Examples and Comparative Examples indicated that the composition containing a refrigerant according to the present invention has such characteristics that the GWP is small, and the COP and refrigeration capacity are equal to or higher than those of R23.

TABLE 1

| | Composition ratio (mass %) | | | | | Evaluation results | | |
| --- | --- | --- | --- | --- | --- | --- | --- | --- |
| | (a) PFC | (b) Unsaturated compound | (c) HFC | | | | Refrigeration capacity ratio (%) (relative | COP ratio (%) (relative |
| | PHC-14 | HFO-1132a | HFC-23 | HFC-32 | HFC-125 | GWP | to R23) | to R23) |
| Comp. Ex. 1 | 0 | 0 | 100 | 0 | 0 | 14800 | 100 | 100 |
| Comp. Ex. 2 | 0 | 0 | 0 | 50 | 50 | 2088 | 24 | 104 |
| Comp. Ex. 3 | 0 | 0 | 0 | 100 | 0 | 675 | 25 | 102 |
| Ex. 1 | 2 | 25 | 40 | 20 | 13 | 6656 | 90 | 98 |
| Ex. 2 | 5 | 25 | 40 | 20 | 10 | 6770 | 96 | 96 |
| Ex. 3 | 10 | 25 | 40 | 20 | 5 | 6960 | 93 | 108 |
| Ex. 4 | 5 | 30 | 30 | 20 | 15 | 5465 | 93 | 96 |
| Ex. 5 | 10 | 30 | 30 | 20 | 10 | 5655 | 103 | 93 |
| Ex. 6 | 5 | 40 | 20 | 0 | 35 | 4550 | 91 | 92 |
| Ex. 7 | 10 | 40 | 20 | 0 | 30 | 4740 | 104 | 91 |
| Ex. 8 | 5 | 40 | 20 | 10 | 25 | 4268 | 90 | 92 |
| Ex. 9 | 10 | 40 | 20 | 10 | 20 | 4458 | 101 | 89 |

TABLE 2

| | Composition ratio (mass %) | | | | | Evaluation results | | |
| --- | --- | --- | --- | --- | --- | --- | --- | --- |
| | (a) PFC | (b) Unsaturated compound | (c) HFC | | | | Refrigeration capacity ratio (%) (relative | COP ratio (%) (relative |
| | PHC-14 | HFO-1132a | HFC-23 | HFC-32 | HFC-125 | GWP | to R23) | to R23) |
| Ex. 10 | 5 | 30 | 20 | 20 | 25 | 4335 | 86 | 98 |
| Ex. 11 | 10 | 30 | 20 | 20 | 20 | 4525 | 95 | 95 |
| Ex. 12 | 5 | 20 | 20 | 30 | 25 | 4403 | 79 | 100 |
| Ex. 13 | 10 | 20 | 20 | 30 | 20 | 4593 | 91 | 98 |
| Ex. 14 | 5 | 10 | 10 | 40 | 35 | 3273 | 73 | 101 |
| Ex. 15 | 10 | 10 | 10 | 40 | 30 | 3463 | 86 | 100 |
| Ex. 16 | 5 | 10 | 10 | 40 | 35 | 3340 | 56 | 90 |
| Ex. 17 | 10 | 10 | 10 | 40 | 30 | 3530 | 69 | 90 |
| Ex. 18 | 5 | 5 | 5 | 40 | 45 | 2950 | 45 | 85 |
| Ex. 19 | 10 | 5 | 5 | 40 | 40 | 3140 | 58 | 84 |
| Ex. 20 | 5 | 10 | 0 | 40 | 45 | 2210 | 48 | 87 |
| Ex. 21 | 10 | 10 | 0 | 40 | 40 | 2400 | 62 | 88 |

The invention claimed is:

1. A composition comprising a refrigerant, wherein the refrigerant comprises
    (a) PFC-14 as perfluorocarbon (PFC),
    (b) an unsaturated compound, and
    (c) HFC,
    wherein the (b) unsaturated compound is HFO-1132a,
    wherein the (c) HFC is HFC-23, and
    wherein PFC-14 is contained in an amount of 1 to 15 mass % based on the total amount of the refrigerant.

2. The composition according to claim 1, wherein the (b) unsaturated compound further comprises at least one compound selected from the group consisting of HFO-1234yf, HFO-1234ze(E), HFO-1234ze(Z), HFO-1225ye, FO-1114, HFO-1123, HFO-1132(E), HFO-1132(Z), HCFO-1233zd, HCFO-1224yd, and HCFO-1122a.

3. The composition according to claim 1, wherein the (c) HFC further comprises at least one compound selected from the group consisting of HFC-32, HFC-125, HFC-143a, HFC-134a, and HFC-134.

4. The composition according to claim 1, wherein the (b) unsaturated compound further comprises at least one compound selected from the group consisting of HFO-1123, and HFO-1132(E).

5. The composition according to claim 4, wherein the (c) HFC further comprises at least one compound selected from the group consisting of HFC-32, and HFC-125.

6. The composition according to claim 1, wherein the (b) unsaturated compound further comprises at least one compound selected from the group consisting of HFO-1234yf, HFO-1234ze(E), HFO-1123, and HFO-1132(E), and the (c) HFC further comprises HFC-32, HFC-125, and HFC-134a.

7. The composition according to claim 1, further comprising a refrigerant oil and is used as a working fluid for a refrigeration apparatus.

8. The composition according to claim 1, which is used as an alternative refrigerant for R23, R404A, or R410A.

9. The composition according to claim 1, further comprising at least one material selected from the group consisting of tracers, compatibilizing agents, ultraviolet fluorescent dyes, stabilizers, and polymerization inhibitors.

10. The composition according to claim 1, wherein the (a) PFC further comprises at least one compound selected from the group consisting of PFC-116, PFC-c216, PFC-218, PFC-c318, and PFC-31-10.

11. A refrigeration method comprising operating a refrigeration cycle using the composition according to claim 1.

12. A refrigeration apparatus comprising the composition according to claim 1.

13. The refrigeration apparatus according to claim 12, which is at least one member selected from the group consisting of air-conditioning systems, refrigerators, freezers, water coolers, ice makers, refrigerated showcases, freezing showcases, freezing and refrigerating units, refrigerating machines for freezing and refrigerating warehouses, air-conditioning systems for vehicles, turbo refrigerating machines, and screw refrigerating machines.

* * * * *